Oct. 31, 1944.   C. F. WALLACE   2,361,723
PRESSURE RESPONSIVE METER APPARATUS
Filed Jan. 31, 1940   4 Sheets-Sheet 2
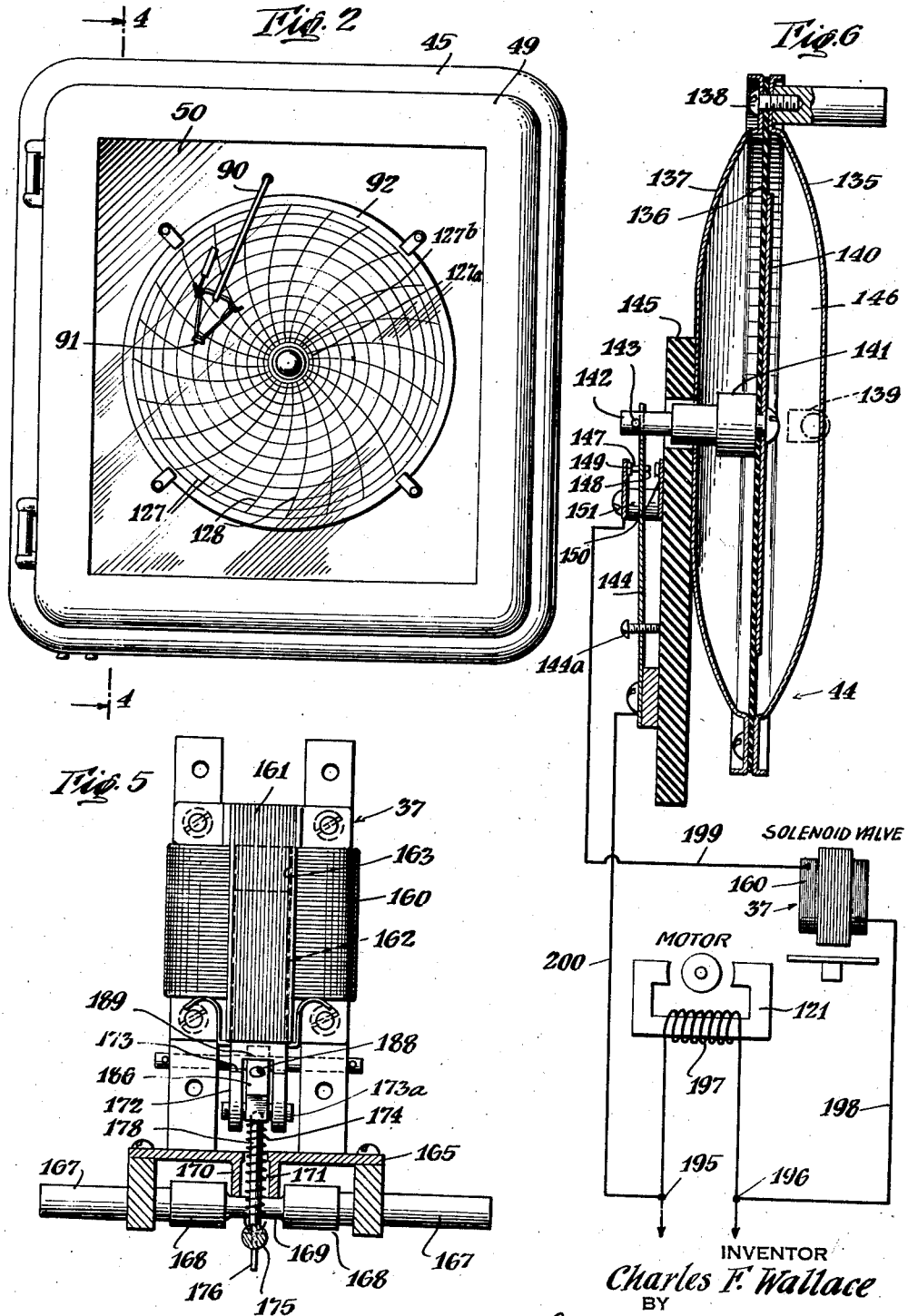
INVENTOR
Charles F. Wallace
BY
Cooper, Kerr & Dunham
ATTORNEYS

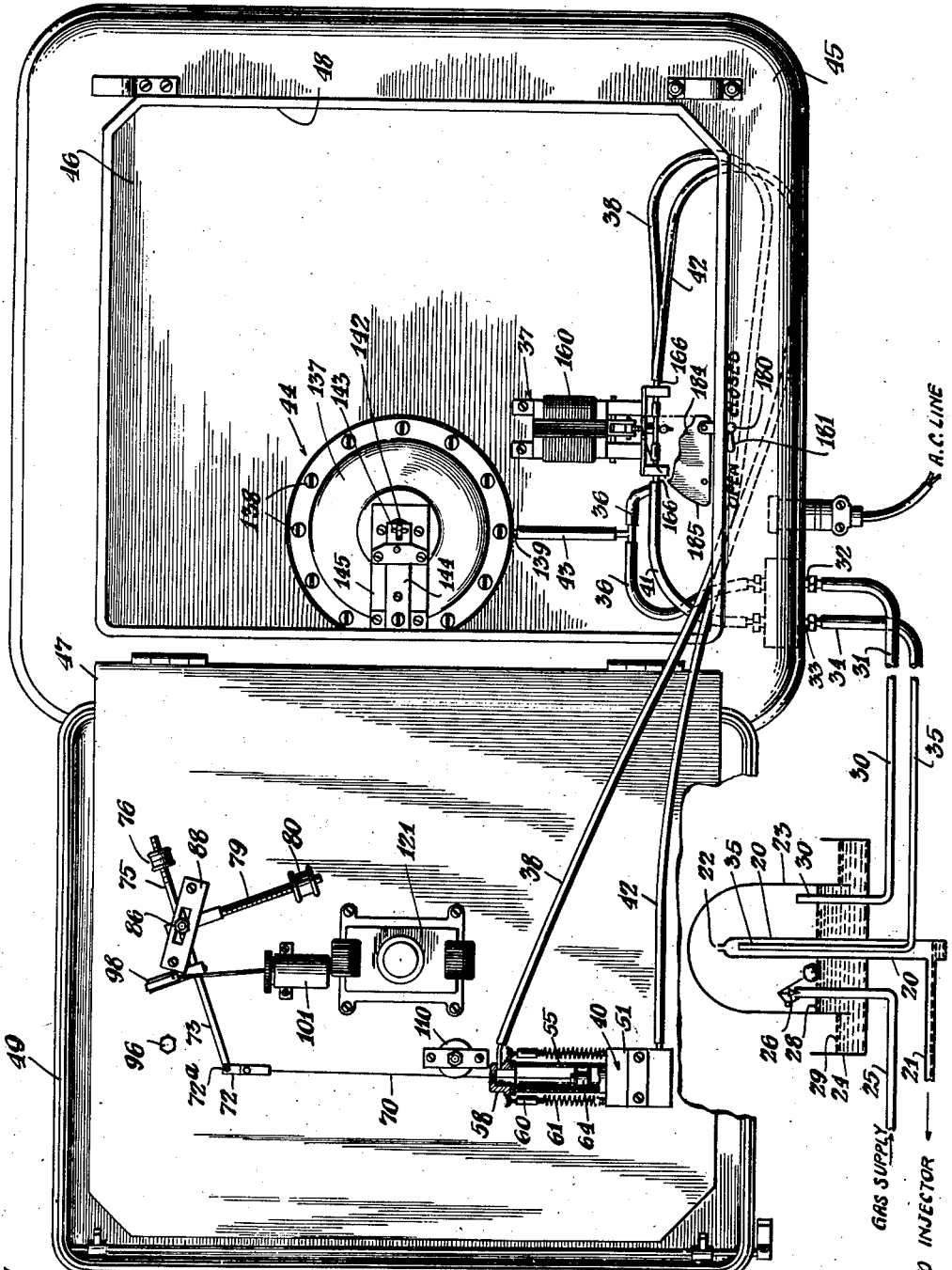

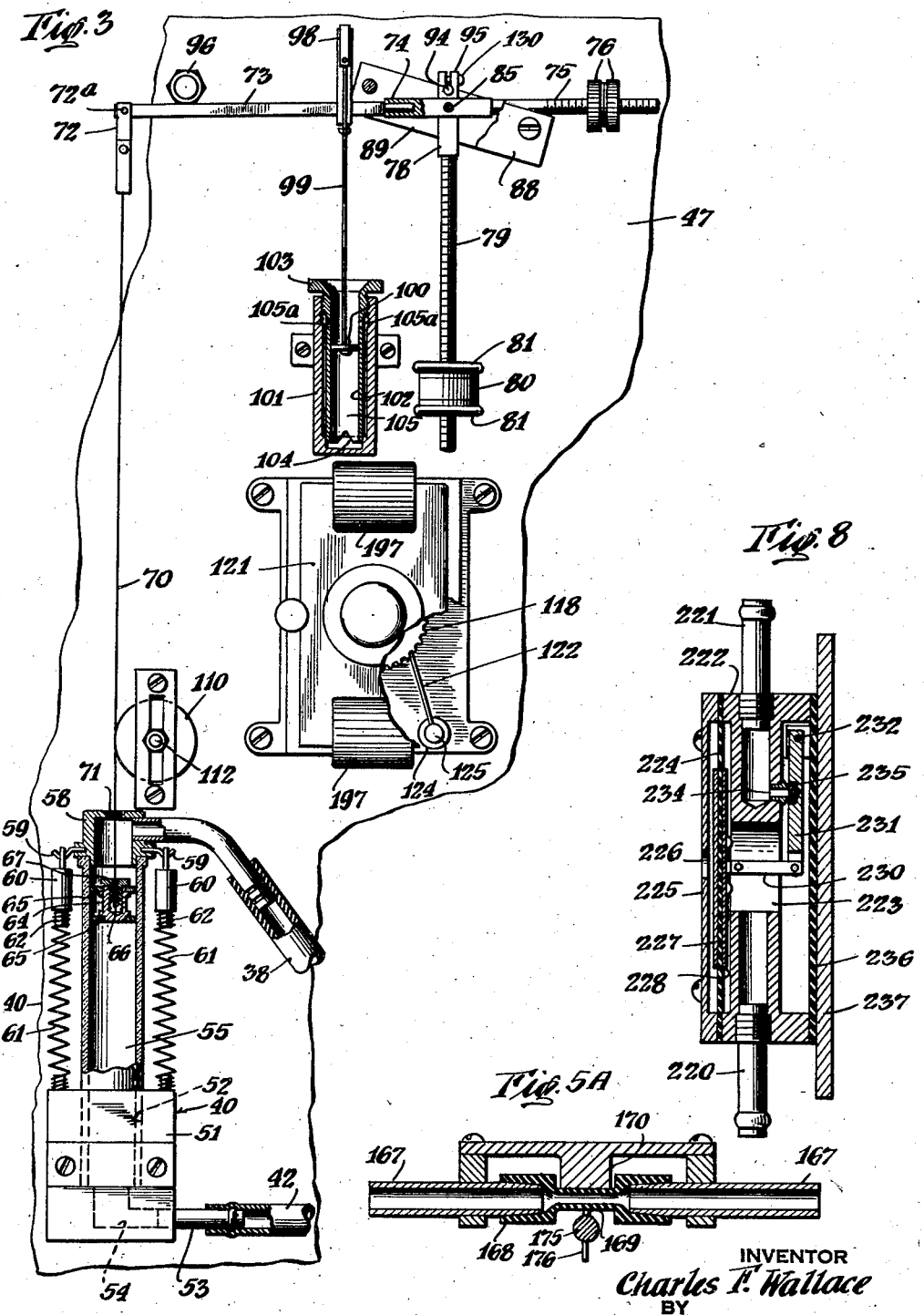

Oct. 31, 1944.                C. F. WALLACE                2,361,723
                    PRESSURE RESPONSIVE METER APPARATUS
                    Filed Jan. 31, 1940          4 Sheets-Sheet 4
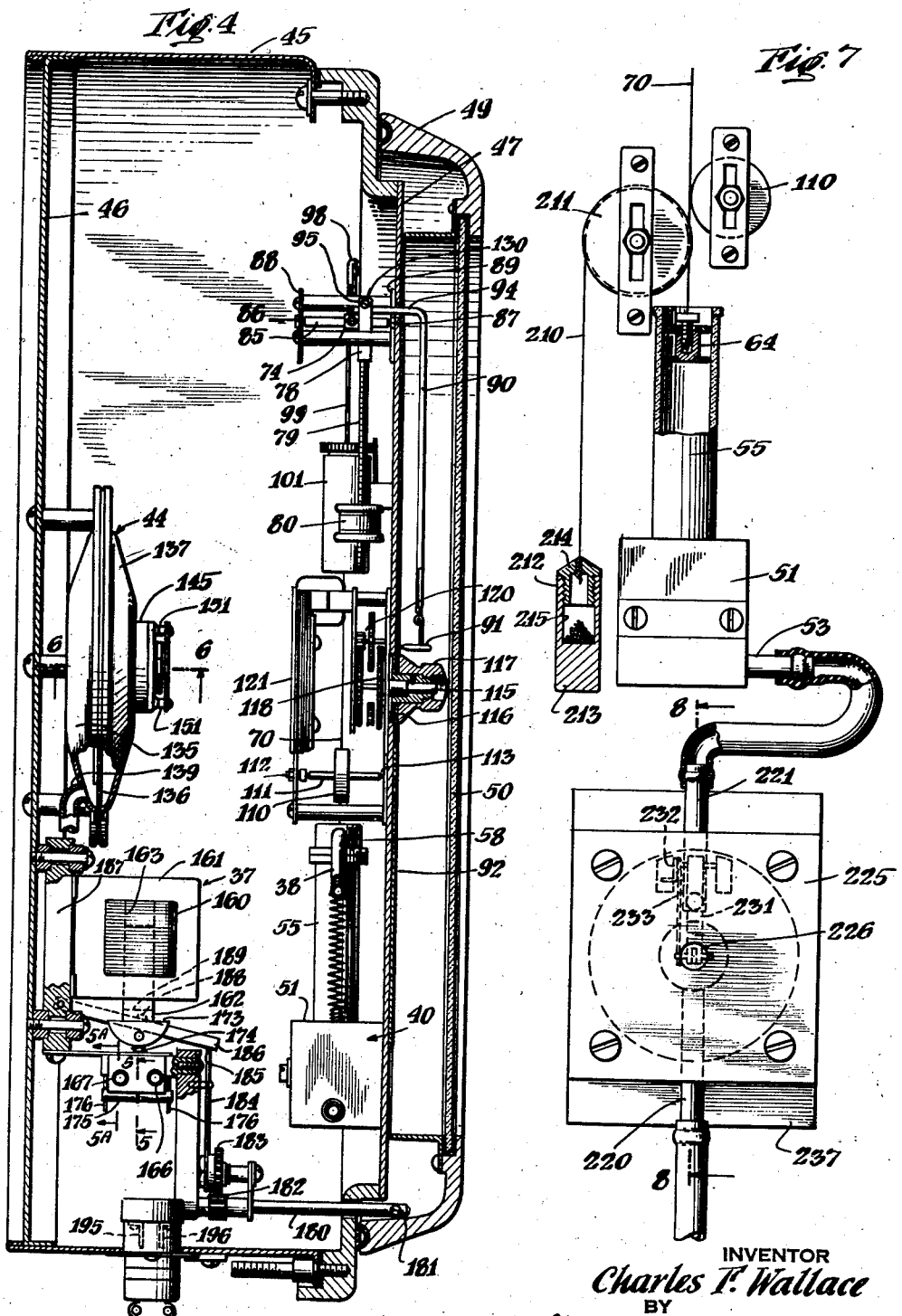
INVENTOR
Charles F. Wallace
BY
Cooper, Kent + Dunham
ATTORNEYS Patented Oct. 31, 1944

2,361,723

UNITED STATES PATENT OFFICE 2,361,723

PRESSURE-RESPONSIVE METER APPARATUS

Charles F. Wallace, Westfield, N. J., assignor to Wallace & Tiernan Products, Inc., Belleville, N. J., a corporation of New Jersey Application January 31, 1940, Serial No. 316,473

18 Claims. (Cl. 73—419)

This invention relates to detecting, recording and indicating means and procedure, notably of pressure-responsive type, and designed, for example, to detect and record gas flows handled under small pressures, particularly small negative pressures. A chief object of the invention is to provide improved measuring apparatus and procedure for chemical feed apparatus of the type wherein a fluid or other treating agent is controlled by pressure variations, usually variations of a pressure difference, for feed to the material being treated; and in one specific aspect, the invention relates to improvements in or for vacuum type chlorinators and the like, viz. devices wherein the chlorine gas or other fluid is fed at a pressure below atmospheric, i. e., a "negative pressure."

In a particularly satisfactory type of chemical feed device known as a chlorinator the gas is drawn through a so-called metering orifice by a difference of negative pressures on opposite sides of the orifice, and the flow of gas is controlled by varying the pressure difference, conveniently by adjusting the negative pressure on the output side of the orifice. For indication of the gas flow, connection of a vacuum gauge has been made to the source of vacuum, e. g., the gas output line from the metering orifice of the chlorinator; but available types of gauges have been unsatisfactory for such purpose in several respects. Unless very delicate (and thus otherwise unreliable), they are usually insufficiently sensitive or accurate to operate properly over the narrow pressure ranges involved, and this disadvantage is greatly enhanced in the case of certain prior recording instruments, as even the drag of the pen on the paper chart has been found to cause some error, and the least bit of friction due to dust or lack of oil seriously affects the accuracy of such apparatus. Furthermore, prior types of vacuum gauges have often involved delicate metal parts of a character to be corroded and injured by the chlorine which tends to work back into the instrument.

Accordingly, an object of this invention is to provide measuring apparatus which avoids or minimizes one or more of the foregoing disadvantages, and particularly to provide improved flow recording apparatus of a sensitive, rugged, reliable and accurate character. It will be appreciated that recording is not only desirable for the usual purposes of control, interpretation, future economy and the like, but is of special importance in public health installations, as in chlorinating public water supplies and sewage systems, where health considerations demand the highest care and a scrupulously kept record of operations.

Other objects are: to provide efficient, accurate, long-wearing and relatively inexpensive apparatus for detecting pressure changes, particularly changes of small pressures such as the low negative pressures in chlorinators; to provide simplified measuring apparatus which may efficiently take into account the pressures on both sides of the feeding element in a chlorinator or the like; to provide apparatus of the character described wherein the sensitive translating instrumentalities may be relatively unsusceptible of corrosion, and wherein little or no oil lubrication is necessary; to provide gas flow or pressure-detecting apparatus having improved automatic means for response to abnormal pressure conditions at the source, so as then for instance to afford a zero or sub-zero reading; and to provide pressure-responsive apparatus yielding a substantially linear or other desirable reading of gas flow, without cams or other mechanically inefficient structure.

Further objects and advantages include those which are hereinafter stated or apparent, or which are incidental to the invention. The nature of the latter will be conveniently explained by reference to the following description and accompanying drawings, which set forth, by way of example, certain presently preferred embodiments of the invention.

In the drawings:

Fig. 1 is an elevational view of one form of recording apparatus embodying the invention, the case of the recorder apparatus being open and connections to a gas feed device being diagrammatically illustrated;

Fig. 2 is a front elevation of the recorder of Fig. 1;

Fig. 3 is an enlarged elevation, with parts in section, of the left hand side of the apparatus of Fig. 1;

Fig. 4 is a vertical section, partially fragmentary, on line 4—4 of Fig. 2;

Fig. 5 is a detail front elevation, partly in section on line 5—5 of Fig. 4, of a solenoid valve shown in Figs. 1 and 4; Fig. 5-A is a detail section on 5—A, 5—A, Fig. 4;

Fig. 6 is a horizontal section, on line 6—6 of Fig. 4, of a diaphragm switch shown in the latter;

Fig. 7 is an elevational view, similar to Fig. 3, of a modified form of certain structure of the invention; and Fig. 8 is a section, on line 8—8 of Fig. 7, of a diaphragm valve shown in the latter.

Although the illustrated apparatus may be used for other purposes, it is of particular value for indicating and recording the flow of chlorine gas in a vacuum type chlorinator, for example, an automatic vacuum chlorinator of the general type disclosed in United States Patent No. 1,777,987, issued October 7, 1930, upon my application; reference being conveniently had to the diagrammatic showing in Fig. 6 of that patent, as well as to other portions of the patent and also to my Patents Nos. 1,777,986 and 1,762,706, issued October 7, 1930, and June 10, 1930, respectively, which show other structural features of utility in or relative to such apparatus. Such chlorinators may be adapted to proportion the feed of chlorine gas in any desired ratio to the water or other liquid under treatment, and to that end comprise, as explained in the cited patents, means for generating a vacuum which varies in accordance with the flow of the material to be treated, or as otherwise desired or controlled, and which ultimately draws the chlorine gas to an injector or aspirator device, whence the resulting mixture of chlorine and water is fed to the liquid under treatment.

Referring to the diagrammatic illustration of certain chlorinator parts in Fig. 1, the variable controlling vacuum is generated in a so-called metering tube 20 (by means not shown) which has an appropriately disposed outlet 21 for conveying the chlorine to the injector (not shown) and which has at its upper end a small metering orifice 22 opening in the interior of a bell jar 23, inverted in a water-containing tray 24. Chlorine gas is introduced to the interior of the bell jar 23 through the line 25 and a float valve 26, and it will now be seen that the rate of feed of chlorine gas, through the metering orifice 22 and out through the tubes 20 and 21, varies in accordance with variations of negative pressure difference between the "high vacuum" side (metering tube 20) and the "low vacuum" side (bell jar 23) of the metering orifice 22. In the ordinary operation of a chlorinator such as is described in the cited patents, the inside water level 28 is maintained substantially at a predetermined height above the outside water level 29 in the tray 24 and the vacuum within the bell jar is substantially constant during normal working; there may, however, be some appreciable variation of this vacuum, particularly in chlorinators of larger capacity, for example, during the periods of change in the control vacuum in the tube 20, and also under abnormal circumstances such as hereinafter explained.

It will be understood that although for purposes of differentiation the negative pressures across the metering orifice of a chlorinator are sometimes herein identified as "low vacuum" and "high vacuum" respectively, they are ordinarily both of a very low order of vacuum. For example, it is common practice to keep the vacuum under bell jar 23 at about two inches of water, while the differential across the orifice 22 in the metering tube 20 usually ranges up to about 8 inches of water for small capacity chlorinators, and to about 12 inches of water for larger capacity devices.

For operation of the recorder apparatus of the invention of the character shown in Fig. 1, a tube 30 extends into the bell jar 23 and well above any liquid level which might be attained therein; and by an appropriate connection, such as the flexible tube 31, tube 30 is connected to the "low" vacuum input nipple 32 of the recorder apparatus. The latter also has a "high" vacuum input nipple 33 connected by a similar line 34 to a tube 35 opening within the metering tube 20 of the chlorinator. Although other forms of connection to the metering tube or "high" vacuum system of the chlorinator may be employed in some cases, it has been found desirable to have the tube 35 open at a point near the orifice 22 and well removed from the line 21 to the injector, for example, so as to minimize the transfer of spray or other moisture to the recording apparatus.

Vacuum connections within the recording apparatus, conveniently made with flexible rubber tubing or the like, include a line 36 from the low vacuum input 32 to a solenoid valve generally designated 37, and thence continuing as line 38 to the upper end of a piston-operating vacuum cylinder or chamber 40, whereby the upper end of the chamber 40 may be subjected to the "low" vacuum from the interior of the chlorinator bell jar 23. From the high vacuum input 33 a line 41 extends to the solenoid valve 37, and thence as line 42 to the lower end of the vacuum cylinder 40, so that the relatively high vacuum in the metering tube 20 is communicated to the lower end of the cylinder.

The low vacuum line 36 also has a branch line 43 extending to a diaphragm switch 44 which is arranged to control the solenoid valve 37 in the manner hereinafter described.

It will be appreciated that the recording apparatus may be suitably housed, for example in a case having a main body portion 45 with a rear wall 46 on which certain of the apparatus is mounted. The case, which can be advantageously fastened to a wall or other vertical support, has a vertically hinged inside cover plate 47, carrying certain other apparatus as shown, and arranged to swing over and close against the front rectangular aperture 48 of the main portion 45. A hinged outer cover 49 having a large glass window 50 for inspection of the recorder chart may be swung into place over the plate 47, to close up the instrument as shown in Fig. 2.

Referring now more particularly to Fig. 3, the pressure responsive instrumentalities mounted on the plate 47 will be described. The vacuum chamber 40 comprises a hard rubber block 51 having a central cylindrical recess 52 with which the line 42 communicates by means of a silver tube 53 and an appropriate channel 54 in the block. A glass cylinder 55 is seated in the recess 52, and has mounted on its upper end a brass cap or inverted cup 58 having its cylinder-abutting surface ground for gas tight contact. The described assembly is secured together by means of a pair of hooks 59 carried in the cap 58 and engaged by appropriate eyes on brass fittings 60 which carry the upper ends of tensioned stainless steel springs 61 that at their lower ends are secured to the block 51. The fittings 60 may include a spring-holding rod 62 threaded into the fitting for anchoring purposes and adjustment of the spring tension. It will now be seen that the springs serve to clamp the cap 58 against the upper end of the glass cylinder 55 without undue compression on the cylinder, the latter being conveniently cemented into its recess in the block 51.

A piston 64 is mounted to slide vertically in the cylinder 55 and comprises a pair of spaced nickel disks 65, 65 carried at opposite ends of a short aluminum spacing member 66, into the upper end of which is threaded a hard rubber clamping bolt 67 centrally pierced to secure and retain the end of a cord 70 that extends upwardly in the cylinder and out through a Celluloid disk 71 inserted in the cap 58 and having a central aperture just sufficient to permit the cord to pass freely therein. The peripheries of the disks 65 and the interior of the tube 55 are suitably ground, lapped or otherwise finished to accurate circles, with the diameters of the disks approximating, say, 0.0004 inch less than the interior diameter of the tube.

Although other durable, flexible and preferably very inelastic materials may be used, the cord 70 may be satisfactorily made of the synthetic material known by the trade name "Nylon." As shown in Fig. 3, the cord is secured at its upper end to a metal connecting element 72 which has its upper end secured to the end of a balancing arm or lever 73 by means of a pin 72a. The balancing arm 73 has a central reinforcing portion 74 from which extends, to the right as seen in Fig. 3, a threaded rod 75 carrying, in threaded engagement therewith, a pair of weighted collars 76, 76, which may be adjusted longitudinally of the rod and locked against each other in any position of adjustment. Extending downwardly at a right angle to the arm 75 and mounted in a suitable stud 78 on the reinforcing portion 74, there is provided a long threaded aluminum rod 79, which also carries an adjustable weight. The last mentioned weight comprises the free collar 80 and abutting nuts 81, 81, so that, as will now be understood, the weight assembly 81, 80, 81, may be adjusted to and locked in any desired position.

The balancing arm 73 with its attached extensions 75 and 79 is pivoted on a horizontal axis to the plate 47 at the juncture of the axis of rod 79 with that of rod 75. To that end (referring also to Fig. 4) the balancing arm assembly carries, at the stated location, a horizontal steel shaft 85 having pointed ends which seat against suitable hardened steel bearings 86, 87, carried respectively on bearing plates 88, 89; the bearing plate 89 being mounted against the supporting plate 47 and the plate 88 being spaced from the latter by suitable studs, as shown. The resulting structure affords a substantially friction-free bearing for the pivot of the balancing arm assembly, and is not only durable but requires no lubrication.

The balancing arm assembly also carries and operates a pen arm 90, which is adapted to move a pen 91 (Fig. 2) over a circular chart 92 which may be rotated on the outer face of the plate 47, as hereinafter described. The downwardly depending pen arm 90 has at its upper end a horizontal portion 94 clamped in a suitable fitting 95 which is conveniently integral with the central reinforced portions 74, 78 of the balancing assembly, and which extends upwardly from the latter above the axis of the pivot shaft 85, the horizontal portion 94 of the pen arm being mounted as close as possible to the pivot and in such fashion that it may be swung by and with the balancing arm assembly, and substantially about the pivot of the latter. To limit the motion of the balancing arm 73 at a position (preferably horizontal) corresponding to a zero or predetermined sub-zero reading, a stud or nut 96 is mounted on the plate 47 near the left hand end of the arm 73, as shown in Fig. 3.

The sensitivity of the apparatus is so great that in many cases the response of the pen involves an undesirably rapid fluctuation upon slight changes in the controlling vacuum of the chlorinator; and in consequence damping means for the balancing arm assembly may conveniently be included. To that end, the arm 73 at a point between the pivot and the fitting 72, for example, as shown, has clamped on it an upstanding brass support 98 to which there is pivoted a downwardly extending rod 99 which at its lower end is connected to the piston 100 of an oil dashpot 101. The piston 100 is adapted to slide vertically in an internal sleeve 102, which is mounted in a cylindrical recess in the dashpot by means of a threaded adjusting collar 103. Above its lower end, the sleeve 102 is somewhat spaced from the sides of the dashpot recess; at its lower end the sleeve is provided with one or more serrations 104 to cooperate with the there abutting wall of the dashpot, so that the oil filling the interior 105 of the sleeve will communicate with the exterior of the sleeve through an aperture determined by the extent to which the serration 104 extends up to the spaced portion of the dashpot wall, the latter space being in communication with the upper part of the chamber 105 through the holes 105a in the walls of the sleeve 102. Accordingly, adjustment of the extent of damping provided for the balancing arm by the described instrumentalities, may be made by turning the collar 103 so as to raise or lower the serrations 104 and vary the rate of oil flow in the dashpot.

In order to avoid strain on the cord 70 in any but a vertical direction as it extends from the vacuum chamber 40, and particularly to avoid wear and friction between the cord and the orifice plate 71—for example, when the balancing arm assembly has been rocked counterclockwise to some other than the position illustrated in Fig. 3—a guide roller 110 is mounted to abut the cord at a point just above its exit from the cap 58. The roller 110 is carried on a horizontal shaft 111 which is pivoted for free rotation in suitable bearings 112, 113, the mounting and structure of the roller being conveniently similar to that previously described for the shaft 85 of the balancing arm. Although other materials, preferably of such character as to avoid wear on the cord 70, may be used, the roller is satisfactorily made of Bakelite. It will be appreciated that the vacuum chamber 40 is preferably mounted so that its vertical axis is aligned with the juncture of the cord 70 to the upper fitting 72 when the balancing arm is in the zero or sub-zero position illustrated in Fig. 3. In consequence, as the piston 64 moves down in the course of operation of the apparatus, so as to swing the left hand end of the arm 73 down and to the right, the cord will be guided by the roller 110 so as to remain in true vertical alignment between the roller and the piston at all times.

The circular paper or other chart 92 upon which the pen 91 traces the variations registered by the apparatus is removably mounted on a shaft 115, which is journaled in the plate 47; the chart being clamped between a disk 116 carried by the shaft and a clamping nut 117 threaded over the end of the shaft. The other end of the shaft carries a gear 118 which is connected through a suitable train of gears generally designated 120 to the shaft of a drive motor 121. Although a variety of motors may be used, a small synchronous A. C. motor has been found satisfactory and is shown in the drawings for purposes of illustration. It will be understood that the gearing 120 is such as to afford a speed reduction for any desired rate of chart rotation, for example, in chlorine recording work it is usually convenient to show 24 hours operation on each chart, and consequently the motor is geared to turn the shaft 115 at the rate of one revolution per 24 hours. To avoid back lash in the chart drive, a flat phosphor-bronze spring 122 (Fig. 3) is mounted to extend from a collar 124 secured to one of the mounting studs 125 for the gear mechanism. The outer end of the spring 122 bears against the teeth of the gear 118, at an angle between tangent and normal, so as to have a ratchet-like action and prevent back lash, particularly on removing and inserting the charts.

The chart may have any suitable marking lines appropriate to the data being recorded; for example, in recording the flow of a chlorinator, the chart includes the concentric lines 127 corresponding to various rates of flow of chlorine (usually measured in pounds per 24 hours), and curved radially extending lines 128 to delineate hours, half hours or other sub-divisions of time. It will be understood that the curve of the lines 128 preferably conforms to the curve which would be described by the pen 91 upon swinging the balancing arm assembly through its range from the position corresponding to the stop 96. Preferably the chart includes not only a zero flow line 127a near the center, but also a sub-zero or check line 127b closer to the center, for reasons hereinafter explained. The pen arm 90 is preferably adjustable about its mounting on the balancing arm assembly, e. g. by the inclusion of a clamping screw 130 for releasably holding the pen arm portion 94 within an appropriate aperture in the fitting 95.

For control purposes presently to be described the apparatus includes an electromagnetic or solenoid valve 37 controlled by a diaphragm switch 46. Referring to Figs. 1, 4 and 6, it will be noted that the diaphragm switch device comprises a dish-shaped chamber housing 135 over which a soft rubber diaphragm 136 is clamped by an opposed dish-shaped housing 137, the housings having appropriate peripheral flanges between which the edges of the diaphragm are clamped by a suitable plurality of bolts 138. The sealed chamber formed by the housing 135 and the diaphragm has an inlet conduit 139 which is connected, as described above, to the low vacuum line from the chlorinator or like device.

An aluminum backing plate 140 is secured to the face of the diaphragm within the vacuum chamber, being bolted thereto against a Bakelite stud 141 on the other side of the diaphragm. The stud 141 carries a finger 142 having a transverse pin 143 that is adapted to engage the outer side of a contact spring 144, of phosphor-bronze or the like. The contact spring is suitably mounted on a Bakelite plate 145 carried by the housing 137; the plate 145 and housing 137 having a suitable aperture, as shown, for passage of the stud 141 and for communication of the atmosphere to the face of the diaphragm opposite the chamber 146 enclosed by housing 135. The contact spring 144 carries on its opposite sides, respectively, electrical contact elements 147, 148. Spaced from but engageable by the latter are a corresponding pair of contact elements 149, 150 facing each other with the spring in between. The contacts 149, 150 are mounted on brass or other metal plates, as shown, and are electrically connected to each other through the mounting studs 151 for the plates. It will now be seen that according to the position of the diaphragm 136 (biased to the left by the action of the contact spring 144 against the pin 143), either the contacts 147, 149 will be closed (as seen in Fig. 6), or both sets of contacts will be open (for normal operation of the apparatus), or contacts 148, 150 will be closed. The bias of the contact spring 144 may be adjusted by turning the screw 144a which is threaded in the spring and abuts the plate 145; for example, the screw may be adjusted so that the spring is midway between contacts 149, 150, when say, a normal 2" vacuum exists under the chlorinator bell jar.

It will be understood that the diaphragm switch is conveniently mounted on the rear wall 46 of the recorder case. The valve structure (see Figs. 1, 4, 5 and 5—A) which may be electrically operated by the switch is similarly mounted on the wall 46 and includes a solenoid 160 having a laminated outer core structure 161 and a hollow center in which a laminated soft iron core element 162 is disposed to reciprocate vertically. When the solenoid is de-energized the core 162 is in the position shown in Fig. 4 and when the solenoid is energized the core is correspondingly pulled up into the solenoid core opening 163.

Carried below each side of a brass mounting plate 165 which extends horizontally below the solenoid, are a pair of brass tubes 166, 167; i. e., four tubes in all. Although the tubes 166, 166 are disposed in alignment and likewise the tubes 167, 167, the aligned tubes have their inner ends spaced apart and connected by rubber tube structures having thickened end portions 168 fitted over the ends of the brass tubes. The rubber connectors also have thinner-walled central portions of somewhat reduced diameter 169, disposed below a backing rib or block 170, having a central vertical passage 171. The lower end of the solenoid core 162 has a yoke-like configuration 172, with shoulders 173 for limiting upward movement of the core 162 upon their abutment with the outer core 161. The yoke structure 172 carries a transverse pin or rod 173a to which is secured one end of a moderately stiff stainless steel coil spring 174. The spring extends down through the hole 171, and between the reduced center portions 169, 169 of the rubber connectors; and at its lower end the spring is tied to a brass cross rod 175 which is guided by a pair of vertical pins 176, 175 (traversing its ends) so as to slide up and down while remaining in a horizontal position. To guide and steady the spring, an aluminum rod 178 is inserted free within the spring, the spring being under some tension so that it tends to pull the cross rod 175 against the lower end of the guide rod 178, and the upper end of the latter against the underside of the rod 173a.

It will now be seen that if the solenoid is energized, causing the core 162 to be drawn up until the shoulder 173 abuts the outer core, cross rod 175 will be pulled up by the spring 178 so that the cross rod squeezes the thin center portions 169 of the rubber connectors against the block 170, effectively closing the passage in both of the lines traversing the mechanism, i. e., both of the lines corresponding to the tubes 166, 166 and 167, 167. Upon de-energization of the solenoid, the core 162 drops, releasing the described parts and opening the valve structure. It will be understood that by virtue of the resilient connection of the cross rod 175, sufficient pressure is obtained to squeeze the rubber connectors into closed position, and yet, at the same time, the pressure is insufficient to cut or otherwise damage them.

For manual operation of the valve at desired times, there is provided a shaft 180 extending through the housing (Fig. 4) to the front side of the plate 47, and having at its outer end a manually engageable handle or pin 181. At its inner end the shaft carries a pinion 182 which meshes with a gear 183 carried with a cam plate 184 having a curved periphery 185 abutting the underside of a lever 186. The opposite end of the lever 186 (see Fig. 4) is pivoted to the base 187 of the solenoid switch, the lever extending through the yoke 172 at the end of the solenoid core and above the rod 173a. The upper surface of the lever 186 carries a button 188 adapted to engage the underside 189 of the solenoid core (within the yoke) so that if the shaft 180 is rotated so as to turn the cam 90° clockwise from the position illustrated in Figs. 1 and 4, the rising periphery of the cam elevates the lever 186 and by virtue of the consequent abutment with the end of the solenoid core, also brings up the valve-closing cross rod 175 in the same manner as if the solenoid had been energized. Similarly upon throwing the pin 181 in the opposite direction, the cam is reversely rotated, the solenoid core is permitted to fall, and the valves are opened.

It will be understood that the lines 41 and 42 are connected to the aligned brass tubes 166, 166 to provide a valve in the high vacuum line; and similarly the lines 36, 38 are connected to the aligned tubes 167, 167, to provide a valve in the low vacuum conduit intermediate the diaphragm switch and the vacuum chamber 40.

It will now be understood that the position of the piston 64 in the vacuum chamber is governed by the difference in pressure between the vacuum at the bottom of the cylinder 40 and that at the top, and consequently by the difference in pressure on opposite sides of the metering orifice 22 of the chlorinator, by virtue of the connections previously described.

Referring to Fig. 6, it will be noted that the apparatus conveniently has an inlet receptacle having terminals 195, 196, for connection to a suitable source of current such as the usual A. C. line. The windings 197 of the chart driving motor 121 are connected across the terminals 195, 196, and likewise the circuit of the solenoid valve and diaphragm switch, the last mentioned circuit extending from the terminal 196 through the conductor 198, the winding of the solenoid 160, and the conductor 199 to the outer contacts 149, 150, of the diaphragm switch, then alternatively to the inner contacts 147 or 148 thereof (if the switch is closed in either direction), and thence through the conductor 200 to the terminal 195.

The apparatus illustrated in Figs. 1 to 6 may conveniently be adjusted and set in operation as follows:

With the chlorinator or like device not operating, the pen arm 90 is preferably first adjusted so that when the lever 73 is lightly held against the stop 96, the point of the pen 91 rests on the sub-zero or check line 127b of the chart. Upon then starting the chlorinator and seeing that it is in operation with the water lever 28 under the bell jar at the desired point, the manual control 181 of the solenoid valve is turned to the open position and current is turned on to the terminals 195, 196. With the chlorinator operating, even at zero feed, the solenoid 160 should be de-energized, i. e., the normal vacuum within the bell jar of the chlorinator being sufficient to pull over the diaphragm 136 of the diaphragm switch and keep the contact spring 144 at a mid position with both sets of contacts open.

When the chlorinator is running at zero feed the recorder pen preferably rests on the zero (rather than the sub-zero) line of the chart; adjustment for such zero or other minimum pen position being conveniently made with the weights 76 on the horizontal extension 75 of the balancing arm assembly. For scale calibration, the chlorinator can be run at a constant, known high rate of feed, as determined from the orifice meter (not shown) on the chlorinator, or by other test or determination; and adjustment to set the pen arm at the corresponding position on the chart may be readily effected with the calibrating weights 81–80–81 on the depending arm 79 of the balancing assembly. The weight adjustments are preferably checked and slightly modified as necessary, for other rates of feed, and on completion of calibration the chlorinator may be set in regular, e. g. water flow-controlled, operation. The chart motor is started and thereafter the recording apparatus accurately records on the chart the flow of chlorine and its variations.

It will now be understood that the piston 64, during operation is subjected to the downward pull of the higher vacuum on the metering tube side of the chlorinator, as transmitted to the lower end of the cylinder 55. Opposed to this force on the piston is the lower vacuum transmitted to the upper end of the cylinder from the bell jar side of the chlorinator, and also the resultant of the downward force exerted by the balancing weights 76, 76 and 81–80–81 on the other end of the lever assembly 73. Upon a change in the pressure difference on opposite sides of the piston, the latter moves until the adjusted position of the weights, particularly the weights 81–80–81, counterbalances the modified pull on the cord 70, whereupon the apparatus comes to rest with the pen in a position corresponding to the changed rate of chlorine flow. It will be noted that throughout the range of swing permitted the lever assembly, conveniently about 40°–45°, the effect of the lever extension 75 and its weight 76 does not vary a great deal, and is at most approximately proportional to the cosine of the angle of deflection, so that this portion of the balance serves chiefly for purposes of zero-setting.

On the other hand, the balancing force exerted by the extension 79 and weights 81–80–81 increases from sub-zero and zero positions as the piston 64 moves down under increase of vacuum (corresponding to increase of chlorine flow), so as to swing the arm 79 counterclockwise as seen in Fig. 3. Furthermore, the preferred structure illustrated is such that the force or torque exerted by this part of the balance is at least approximately proportional to the sine of the angle of displacement. Not only does the counterbalancing force change with each change in position of the lever, so as to bring the piston to rest in a changed position representative of the change in controlling pressure, but the opposing or balancing force (which governs the extent of piston displacement) is thus generally proportional to a trigonometric function of the angle of deflection, more particularly a function varying from a value less than unity and increasing with increase of the angle. Indeed, in the specific structure shown, since the torques exerted by the piston and by the zero-adjusting weights are generally functions of the cosine, the force of the piston is thus opposed by a force approximately proportional to the tangent of the angle of pen deflection. As a result, and at least for most of the range in the device illustrated, the chart graduations may be substantially equally spaced to read chlorine flow, and the trigonometric function, somewhat corresponding to a quadratic, thus affords a far more linear flow reading than would a direct translation of pressure variations, it being appreciated, of course, that the negative pressure in the chlorinator metering tube 20 varies non-linearly, e. g., approximating the square of the gas flow.

It should also be explained that the apparatus is extremely sensitive; indeed, although the negative pressures and their variations under measurement may be of an extremely low order, the friction and other losses are so slight that they and the pen drag on the chart are often insufficient to provide suitable damping for normal operation, hence the inclusion of the dashpot structure 101. As previously explained the piston 64 is designed to have a very slight clearance within the glass cylinder 55, say about 0.0002 inch all around. The effect of this clearance is to provide an air or gas lubrication for the piston so that no oil or gummy lubricant is needed and free movement of the piston is afforded by the slight leakage of gas or air past it from the upper portion of the cylinder to the lower portion. Lubrication of the cord 70 within its aperture in the Celluloid disk 71 is similarly afforded by a like slight clearance and a corresponding leakage of air around the cord and into the upper part of the cylinder. At the same time, the described air and gas leakages are insufficient to affect the readings of the recorder appreciably.

The described valve structure affords not only a means for disconnecting the vacuum lines manually, but also, with the diaphragm switch, an automatic control for response to abnormal conditions in the chlorinator or like device. That is, when the solenoid valve is energized and closes both of the vacuum lines, maintenance of the "high" vacuum in the lower end of the cylinder 40 (and likewise the lower vacuum at the upper end) is interrupted, and by virtue of the leakage described above, the piston slowly moves up to the top of the cylinder and the pen slowly moves across the chart to the sub-zero or check line, indicating that something is wrong.

It will be understood that the diaphragm and contact spring 144 of the diaphragm switch structure may be readily adjusted by the screw 144a for contact closure upon any predetermined change in the low vacuum condition of the chlorinator. Thus, ordinarily and with minor variations, the vacuum under the bell jar 23 is kept at, say, two inches of water. Now if something happens to the vacuum control system of the chlorinator (not shown) or to the injector devices, so that the vacuum in the metering tube is reduced, and consequently there is nothing to produce any vacuum under the bell jar, the pressure thereunder will increase toward atmospheric. At a predetermined point the resulting increase in pressure within the chamber 146 of the diaphragm switch permits the contact spring to move out and close the contacts 149, 147, so as to operate the solenoid valve, with the consequences described hereinabove.

Similarly if the vacuum under the bell jar becomes too high for any reason, i. e., exceeds a predetermined range of variation incidental to the normal operation of the chlorinator, the diaphragm 140 of the diaphragm switch will be pulled so far into the chamber 146 that contacts 148, 150 are closed and the solenoid valve is likewise operated to closed position. For instance, an abnormally high vacuum under the bell jar of the chlorinator would result from exhaustion of chlorine supply, as the absence of flow would cause the negative pressure to tend to equal that in the metering tube. Although in chlorinators it is usual to provide means responsive to substantial rise of the water level 28 for admitting air to the interior of the bell jar in lieu of chlorine (to prevent injury to the apparatus), such instrumentalities ordinarily do not operate until the vacuum under the jar has increased to a point which would, in the present apparatus, operate the diaphragm switch and move the pen arm to a zero, sub-zero or other extraordinary position.

It may be explained that other instrumentalities for affording a positive indication of abnormal chlorinator vacuum conditions in either direction, as described hereinabove in connection with the diaphragm switch, are disclosed, and these types of control organization are claimed broadly, in the copending application of John R. MacKay, Serial No. 261,853, filed March 14, 1939, for Recording and indicating systems; the present invention representing improvements in various aspects of certain systems therein disclosed. Indeed, the pressure-sensitive recorders of my invention may very advantageously be employed in a number of the pressure-operated systems of that application.

In some cases for indicating and recording changes of a vacuum, only one source of vacuum need be measured. Although for chlorinators of large capacity, such as those adapted to operate at rates of more than 40 pounds per 24 hours, it is desirable to take into account vacuum conditions on both sides of the metering orifice, satisfactory readings may sometimes be obtained, and usually so with chlorinators of lower capacity or of lower normal operating rates, by apparatus responsive only to the variations of "high" vacuum in the metering tube. Although the apparatus of Figs. 1 to 6 might be modified to that end simply by omitting the vacuum connection to the top of cylinder 40 and considerably readjusting the weights, a presently preferred modification for that purpose is illustrated in Figs. 7 and 8, which show also another form of valve device for effecting indication of abnormal conditions.

Referring to Fig. 7, it will be understood that the balancing arm assembly, the chart drive motor, the dashpot and associated instrumentalities, including the pen and chart drive, may be as shown in the other figures. The vacuum chamber conveniently embodies the same lower block 51 and glass cylinder 55 cemented therein, together with the same piston 64. However, the cap 58 and its retaining structure at the upper end of the cylinder are omitted. In order to afford a continuous counterbalance of the piston, corresponding to the substantially constant negative pressure under the bell jar, an additional cord 210 is attached to the piston and passes up over a grooved pulley 211, pivotally mounted for example in the same manner as the roller 110 or the balancing arm pivot (Figs. 3 and 4). On the other end of the supplementary cord 210 a balancing weight 212 is suspended, having a lower weighted body portion 213 and a cap 214 to which the cord 210 is attached and which is threaded into a cavity 215 in the upper part of the body 213. For fine adjustment of the weight, a desired quantity of shot, sand or other heavy material may be introduced into the cavity 215.

It will now be appreciated that the operation of the recording structure will be substantially the same as that illustrated in Figs. 1 to 6, and the pen will record on the chart the variations of flow of chlorine corresponding to variations of negative pressure in the metering tube of the chlorinator or like device, it being assumed that the vacuum in the chlorinator bell jar remains fairly constant in the range of flow covered.

Although cut-off controls such as the diaphragm switch and electromagnetic valve of Figs. 1, 3, 5 and 6, or such as are disclosed in the aforesaid application Serial No. 261,853, may be employed in many cases, another efficient form of controlling device for response to certain abnormal conditions is the diaphragm valve structure shown in Figs. 7 and 8. The device there shown includes a vacuum input tube 220 to extend the metering tube of the chlorinator and a vacuum output tube 221 to be connected to the input nipple 53 of the vacuum chamber 40. The tubes 220 and 221 are threaded into opposite sides of the hard rubber block 222, which has a central opening to form a chamber 223 covered by a soft rubber diaphragm 224 that is clamped over the block by the peripheral shoulder of a brass plate 225 having a central aperture 226 for admission of air to the outer diaphragm surface. The diaphragm is faced on opposite sides by aluminum disks 227, 228, which are bolted together and thereby afford a connection for a phosphor-bronze arm 230 pivoted to an arm 231, which is in turn pivoted to the base of the structure at 232 and is biased by a spring 233 to move itself and the diaphragm outwardly. The outlet tube 221 is enclosed within the hard rubber block 222 except for a valve opening 234 that faces a portion of the arm 231 intermediate its pivot 232 and its connection to the arm 230. The portion of the arm 231 opposite the opening 234 carries a soft rubber disk 235 which is adapted, on outward swing of the arm, to abut a metal seating ridge surrounding the opening 234. The block 222 is secured, through a rubber gasket 236, to a suitable brass base 237.

It will now be understood that upon movement of the link 230 to the right as seen in Fig. 8, under suction of a predetermined vacuum in the chamber 223 upon the diaphragm, the arm 231 is rocked slightly counterclockwise so as to bring the rubber disk 235 away from the valve seat, whereby the valve aperture 234 is opened to the chamber, and the tubes 220 and 221 are brought into communication. The structure is conveniently so designed and adjusted that under normal operating conditions in the metering tube of the chlorinator or like device, the negative pressure is always sufficient to keep the diaphragm 224 displaced inwardly and thus to keep the valve open for communication of the vacuum through to the control chamber 40 of the recorder. However, if the vacuum in the metering tube of the chlorinator drops for any reason, i. e., as by derangement of the means creating it or by failure of the injector or other instrumentalities in the chlorinator, and such drop is below, say, the predetermined vacuum for zero or minimum chlorine flow (say, a vacuum of two inches of water), the diaphragm 224 will move sufficiently to the left to close the valve 235 and shut off the instrument, whereupon the pen arm will move slowly to a zero or preferably subzero position, affording a positive indication and permanent record of the failure or other shutdown in the apparatus.

The valve mechanisms shown in Figs. 5 and 6 and Fig. 8 also serve to prevent seepage of chlorine through the recorder mechanism and into the case and room when the chlorinator is shut down, thus preventing possible corrosion of recorder parts at times when there is no such vacuum in the cylinder 55 as ordinarily causes a slight current of air into the latter.

As exemplified in the several drawings, the instrumentalities of the invention are effectively adapted to fulfill the various objects hereinabove set forth, and it will now be appreciated that the invention affords a simple and accurate arrangement for detecting pressure changes, and particularly for recording the variations of gas feed in response to small changes within a relatively narrow range of low negative pressures, as in a vacuum type chlorinator. At the same time the apparatus is notably free from friction or other losses which would tend to impair accuracy, and is especially rugged and reliable throughout.

It will be understood that parts likely to be exposed to chlorine or other corrosive gas are preferably of resistant materials, such as glass, hard rubber, silver or nickel, or are plated with such material as silver or nickel; and although various materials have been named hereinabove for certain parts (by reason of corrosion-resistance, lightness, durability or other desired characteristic), other suitable materials may be satisfactorily used in many cases.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

I claim:

1. Apparatus for recording gas flow in a device advancing gas through a feed element by a difference of negative pressures across the same and at least in accordance with variation of the negative pressure on the further side of the element, comprising a cylinder adapted at one end to communicate with said further side of the element, a piston in the cylinder having a slight clearance therein for lubrication by gas leakage, pivoted balancing structure having an arm connected to the piston, balancing weight means, and a mounting arm for said weight means secured at a substantial angle substantially less than 180°, with the first-mentioned arm, for balancing and arresting the piston in positional accordance with the pressure on it, and marking means mounted to the balancing structure and shiftable therewith, said pivoted balancing structure and weight means being adapted to effect angular displacements of the marking means about the pivot of the structure, in substantially linear proportion to changes in the gas flow to be recorded.

2. The apparatus of claim 1 wherein the cylinder has means closing its other end and adapted to communicate with the entering side of the feed element whereby the force on the piston represents the difference of pressures; and wherein the connection intermediate the piston and the first arm of the balancing structure comprises a cord traversing an aperture in the aforesaid closed end of the cylinder and having a slight clearance therein for lubrication by gas leakage, said cord having roller means for keeping it parallel with the cylinder walls as it leaves the cylinder.

3. The apparatus of claim 1 wherein supplementary weight means are connected to the piston for exerting thereon a constant force corresponding to the negative pressure on the entering side of the feed element.

4. Measuring apparatus adapted to be governed by pressure changes in a gas handling apparatus, comprising gas communicating passage means for connection to said gas handling apparatus, a pressure-sensitive translating device including an operating piston therefor, and a cylinder for the piston connected to said passage means, for detection of the pressure changes by adjustment of the piston, said cylinder being adapted to provide gaseous leakage around said piston and the piston being thereby adapted to move automatically to a predetermined end position upon closing the said passage means, and valve means for closing the passage means, said valve means having control means therefor, controllable in response to an abnormal pressure condition in the gas handling apparatus, for operating the valve means to close the passage means and thereby cause the device to indicate said condition by movement of the piston.

5. A vacuum-responsive translating device, comprising a cylinder having passage means for connecting it to a source of vacuum, a plunger therein having its periphery slightly smaller than the inner circumference of the cylinder, for lubricating the movement of the plunger by the vacuum-induced passage of gas around the periphery of the plunger and without substantial impairment of the degree of vacuum transmitted to the cylinder, said plunger being adapted to move to a predetermined end position on interruption of vacuum supply to said cylinder, a translating element positionally adjusted by movements of the plunger, a diaphragm exposed on one side to the atmosphere and having means adapted to expose the other side of the diaphragm to vacuum conditions at said source, a valve for closing the passage means to the cylinder, and means controlled by said diaphragm in response to displacement thereof to a predetermined position representative of an abnormal vacuum condition at said source, for operating the valve, whereby the translating element is adjusted to an end position to represent said abnormal condition.

6. Apparatus for detecting gas flow in a gas-handling device having an element through which gas is fed in accordance with a variable difference of pressure across the same, comprising piston means, chamber means for subjecting opposite sides of the piston means respectively to the gas pressures on opposite sides of said element, a translating member shiftable by said piston means, said piston and chamber means being fitted with clearance to permit gas leakage, valve means for positively interrupting gas and pressure communications between opposite sides of the piston means and opposite sides of said element respectively, and means responsive to change of the pressure on one side of said feeding element selectively to each of a predetermined high pressure and a predetermined low pressure respectively representative of abnormal conditions in the gas-handling device, for operating said valve means, said piston means being adapted to move said translating member to a predetermined end position on interruption of controlling pressure to said chamber means.

7. Measuring apparatus responsive to negative pressures, comprising a cylinder, passage means connected thereto for receiving negative pressures, movable structure in the cylinder to be displaced in accordance with pressures thereon, said movable structure having a slight clearance to provide leakage flow from the atmosphere for lubrication and for diminishing any transfer of gas from the passage means through the cylinder, indicating means adjusted by said structure, valve means for closing the passage means, and pressure-sensitive means connected to the passage means and responsive to a decrease of negative pressure below a predetermined value, for operating the valve means, to cause displacement of the movable structure to a position representative of an absence of negative pressure, and to interrupt communication between the passage means and the cylinder.

8. The apparatus of claim 7 wherein: the passage means comprises a pair of conduits respectively opening into opposite ends of the cylinder, the pressure sensitive means being connected to one of said conduits; the movable structure comprises a piston in the cylinder between the ends thereof, and a connecting member extending from said piston through one end of the cylinder for adjusting the indicating means in accordance with the difference between negative pressures on opposite sides of the piston, said cylinder having an apertured closure at its last-mentioned end, for passage of said connecting member therethrough with clearance; and the valve means is adapted to close both said conduits, whereby upon operation of the pressure-sensitive means in response to the aforesaid decrease in negative pressure, the indicating means is adjusted to a position representative of an absence of pressure difference between the conduits.

9. Measuring apparatus adapted to be governed by pressure changes in a gas handling apparatus, comprising gas-communicating passage means for connection to said gas handling apparatus, a pressure-sensitive translating device connected to said passage means to detect the pressure changes and be adjusted thereby, said device including a pressure-receiving chamber and disposed in the chamber, for operating the device, a piston which has a slight clearance for lubrication by leakage of gas about its periphery in said chamber and which is adapted to move to a predetermined abnormal position upon dissociation of the device from the gas handling apparatus, and valve means for the passage means, said valve means having control means therefor controllable in response to a predetermined abnormal pressure condition in the gas handling apparatus, for operating the valve means to dissociate the device from the apparatus and thereby cause the device to indicate said pressure condition by movement of the piston to the aforesaid abnormal position.

10. The apparatus of claim 9 wherein the valve means comprises flexible conduit means in the passage means, means for constricting said flexible conduit means to close same and electromagnetic operating means for said constricting means, and wherein the control means comprises a member displaceable in accordance with the difference between atmospheric pressure and the pressure condition in the gas handling apparatus, and electrical supply means, including contacts operated by displacement of said member to a position corresponding to the abnormal pressure condition, for energizing the electromagnetic means.

11. Apparatus for detecting gas flow in a feeding device wherein the gas is advanced at a rate controlled by variation of negative pressure, comprising a chamber having conduit means for communication with the feeding device to receive a varying negative pressure, a piston in the chamber having a slight clearance therein for lubrication by gas leakage, indicating means adjustable by the piston and including balancing structure for the latter, and means including valve means in the conduit means, a pressure-shiftable element exposed on one side to the atmosphere and on the other side to pressure in the conduit means, and means responsive to the position of said element for operating the valve means to close the conduit means when the pressure therein has a predetermined value representative of abnormal condition in the feeding device, said piston being adapted to shift the indicating means to a predetermined end position on closure of said conduit means.

12. The apparatus of claim 11 wherein the balancing structure includes adjustable means for applying balancing force in opposition to the piston, to correspond to a negative pressure representing zero flow in the feeding device, whereby the balancing structure may be adjusted for zero reading at a desired predetermined position.

13. Gas flow measuring apparatus adapted to be governed by negative pressure changes in a gas feeding apparatus wherein gas is fed at a rate controlled by varying negative pressures, comprising gas-communicating passage means for connection to said gas feeding apparatus, a pressure-sensitive translating device connected to said passage means to detect the pressure and be adjusted thereby, said device including means converting detected pressure changes into readings of gas flow and said device being adapted to provide a slight flow of air drawn through it into the passage means by the negative pressure, and valve means for closing the passage means, said valve means having control means therefor, controllable in response to decrease of negative pressure in the gas handling apparatus below a predetermined value, for operating the valve means to prevent gas communication between the gas handling apparatus and said device when the negative pressure is below said valve.

14. Apparatus for detecting gas flow in a device which advances gas through a feeding element under a negative pressure and wherein the rate of flow is determinable in accordance with the difference between negative pressure on opposite sides of said feeding element, comprising a cylinder, a piston in the cylinder having a slight clearance therein for lubrication by gas leakage, an adjustable device exterior of the cylinder, means controlled by the piston for adjusting said device in response to positional displacements of the piston, said cylinder having conduits connected thereto and communicating with the interior of the cylinder at respectively opposite ends thereof, said conduits being adapted for communication with the gas-advancing device to receive the negative pressures on opposite sides of the feed element respectively, and said cylinder being closed against appreciable gas communication with the exterior thereof except through said conduits, and means disposed exteriorly of the cylinder and of said conduits and controlled by said adjustable device, for registering gas flow through the gas-advancing device, as represented by difference of the negative pressures supplied to the cylinder by the conduits.

15. Apparatus for detecting gas flow in a device which advances gas through a feeding element under a negative pressure and wherein the rate of flow is determinable in accordance with the difference between negative pressures on opposite sides of said feeding element, comprising a cylinder, a piston in the cylinder having a slight clearance therein for lubrication by gas leakage and having connecting means extending out of the cylinder for transmitting positional displacements of the piston, said cylinder having conduits connected thereto and communicating with the interior of the cylinder at respectively opposite ends thereof, said conduits being adapted for communication with the gas-advancing device to receive the negative pressures on opposite sides of the feed element respectively, and said cylinder being closed against appreciable gas communication with the exterior thereof except through said conduits, but having an aperture at one end for traversal of said connecting means, said connecting means having a slight clearance in said aperture for lubrication by leakage of air into the cylinder by reason of the suction of negative pressure therein, and translating means disposed exteriorly of the cylinder and of said conduits, and connected to said connecting means and including a positionally adjustable member, for translating changes in position of said piston into changes of position of said member, whereby the position of the member registers gas flow as represented by difference of the negative pressures supplied to the cylinder by the conduits.

16. Gas flow measuring apparatus adapted to be governed by pressure changes in a vacuum type gas feeding apparatus wherein the gas is fed by a suction means and in accordance with changes in difference of negative pressure thereby produced across a gas handling structure and wherein failure of gas supply and failure of suction means are evidenced by predetermined high and predetermined low negative pressures respectively, on the entering side of said gas handling structure; said measuring apparatus comprising gas-communicating passage means for connection to said gas handling structure, pressure-responsive translating means connected to said passage means and having a pressure-sensitive device to detect negative pressure changes and be adjusted thereby, said device being provided with a gas leakage passage and said device being thereby adapted to move automatically to a predetermined abnormal position upon a closing of said first-mentioned gas-communicating passage means, valve means for closing the first-mentioned gas-communicating passage means, said valve means having control means therefor responsive to both said predetermined high and low negative pressures, for operating said valve means in the event of the appearance of either of said pressures at said entering side, and means associated with said pressure-sensitive device for causing the latter to move automatically to said predetermined abnormal position when said valve means closes the said first-mentioned gas-communicating passage means.

17. Measuring apparatus adapted to be governed by pressure changes in a gas handling apparatus, comprising gas-communicating passage means for connection to said gas handling apparatus, pressure-responsive translating means connected to said passage means and having a pressure-sensitive device to detect the pressure changes and be adjusted thereby, said device being provided with a gas flow passage and said device being thereby adapted to move automatically to a predetermined abnormal position upon a closing of said first-mentioned gas-communicating passage means, valve means for closing the first-mentioned gas-communicating passage means, said valve means having control means therefor, controllable in response to an abnormal pressure condition in the gas handling apparatus, for operating the valve means to close the first-mentioned gas-communicating passage means and thereby cause the device to indicate said condition by taking up said predetermined position, and means associated with said pressure-sensitive device for causing the latter to move automatically to said predetermined abnormal position when said valve means closes the said passage means.

18. Measuring apparatus adapted to be governed by pressure changes in a gas handling apparatus, comprising gas-communicating passage means for connection to said gas handling apparatus, a pressure-responsive translating means connected to said passage means and having a pressure-sensitive device to detect the pressure changes and be adjusted thereby, said device being provided with a gas flow passage and said device being thereby adapted to move automatically to a predetermined abnormal position upon a closing of said first-mentioned gas-communicating passage means, means including a pressure-responsive valve in said first-mentioned gas-communicating passage means for closing the same in response to predetermined abnormal value of the controlling pressure from the gas-handling apparatus, said last mentioned means comprising a chamber communicating with said passage means, a diaphragm sealing the chamber, said chamber being divided by a partition into two compartments, one of which is connected to the gas-handling device and the other connected to the pressure-responsive translating means, a passage through said partition, a valve element shiftable to close said passage, means responsive to a predetermined displacement of the diaphragm for shifting the valve element, and means associated with said pressure-sensitive device for causing the latter to move automatically to said predetermined abnormal position when said valve means closes the said first-mentioned gas-communicating passage means.

CHARLES F. WALLACE.